United States Patent Office 3,804,790
Patented Apr. 16, 1974

3,804,790
EXTERNALLY CATALYZED THERMOSETTING COATING COMPOSITIONS COMPRISING ALKYLOLATED AMIDE INTERPOLYMERS OF HIGH ACID CONTENT IN COMBINATION WITH LOW MOLECULAR WEIGHT POLYHYDRIC ALCOHOLS
Kazys Sekmakas, Chicago, Ill., assignor to De Soto, Inc., Des Plaines, Ill.
No Drawing. Filed Jan. 4, 1972, Ser. No. 215,413
Int. Cl. C08f 45/34
U.S. Cl. 260—29.6 TA       13 Claims

ABSTRACT OF THE DISCLOSURE

A thermosetting coating composition adapted to deposit coatings which cure on baking more completely, more rapidly, and at lower temperature to provide a pencil hardness of 1H or harder, and which possess improved flexibility, solvent resistance and impact resistance, comprising non-gelled interpolymer of monoethylenically unsaturated monomers comprising from 3–25% by weight of alkyloated carboxylic acid amide, monoethylenic carboxylic acid in an amount to provide in the interpolymer a ratio of carboxyl to N-alkylol functionality of from .3:1 to 1.2:1, and at least 30% by weight from the group of styrene, vinyl toluene and methyl methacrylate, in admixture with a polyhydric alcohol having a molecular weight of up to about 6000, in an amount to provide a ratio of hydroxy to N-alkoxy functionality of from .02:1 to .6:1, and dissolved inorganic metal catalytic salt in an effective amount up to about 4%, based on the weight of the interpolymer, preferably a chloride, perchlorate, bromide or nitrate of lithium, magnesium, calcium, barium, zinc or manganese.

---

The present invention relates to thermosetting coating compositions which are externally catalyzed to deposit films which cure more completely, more rapily, and at lower temperature to form a hard film possessing improved flexibility, solvent resistance, and impact resistance, and comprising alkylolated amide interpolymer of high acid content in combination with low molecular weight polyhydric alcohols and an effective amount up to about 4%, usually 0.1%–3%, and preferably from about 0.25 to about 2%, based on the weight of the interpolymer, of dissolved inorganic metal catalytic salt.

Alkylolated amide interpolymers typified by interpolymers containing methylolated acrylamide are known and widely used as the basis for thermosetting coating compositions, the thermosetting cure causing the desired hardness and solvent resistance to be developed in the film after it is applied. However, when it was desired to formulate such interpolymers for the deposition of cured films having a pencil hardness of 2H–3H or harder, as are desired for appliance coatings, then flexibility and impact resistance were not good, e.g., normally such cured hard coatings have been unable to withstand more than about 5 inch pounds of forward impact. Also, and whenever external catalysts are employed in order to speed the cure, or lower the temperature required for cure, then the cured coatings tend to be even more brittle than when cured in the absence of such external catalysts. This embrittling tendency is accentuated if the coating is subjected to overbaking or is tested after ageing. Accordingly, the provision of externally catalyzed coatings of the type under consideration to provide cured films which are both hard and flexible represents a special problem.

As a feature of the invention, the thermosetting coating compositions cure more completely to provide cured coatings which possess improved solvent resistance and improved blocking resistance. In this invention, the presence of the inorganic metal catalytic salt enables a more complete cure to be obtained. As a result, the solvent resistance and blocking resistance are improved in comparison with what could be developed from the same coating composition in the absence of the metal salt, even under more vigorous baking conditions.

The term "blocking resistance" denotes the tendency of the cured coatings to stick under heat and pressure as when coated panels are stacked after baking.

The alkylolated amide interpolymers of this invention are required to include, in addition to from 3–25% by weight of the alkylolated amide, preferably from 7–20%, an amount of copolymerized monoethylenically unsaturated carboxylic acid sufficient to provide a ratio of carboxyl to N-alkylol (normally N-methylol) functionality of at least .3:1, preferably at least .5:1. This minimum proportion of carboxylic acid is required in this invention to serve as one of the reactants in the alkylolated amide interpolymer so that the desired hardness and solvent resistance will be developed when a coating composition containing the interpolymer and a polyhydric alcohol is applied as a film and cured. When sufficient acid reactant is not present, then the desired hardness and solvent resistance are not obtained, even when the curing conditions and the presence of catalytic metal salt are more than sufficient to insure a complete cure.

The utilization of copolymerized monoethylenically unsaturated carboxylic acid to provide an internal catalysis is known in the prior art, it being indicated in Pat. 2,978,437 that from about 1 to about 30% by weight of unsaturated acid is appropriate. However, in normal practice, less than 2% by weight of acid normally provides all of the catalysis which is desired. Indeed, and in my prior U.S. Pat. No. 3,257,475, I encountered a tendency for films to overcure and become brittle at acid values in excess of 30. It is pointed out that the acid values of the interpolymers utilized herein are normally so high as to lead to brittle films were it not for the polyhydric alcohol component to be discussed hereinafter. It is also stressed that the external catalysis relied upon herein dominates the cure which is normally carried out in this invention under conditions of time and temperature which are insufficient to adequately cure the coatings in the absence of the inorganic metal catalytic salt.

While the minimum ratio of carboxyl functionality to N-alkylol functionality is important as noted hereinbefore, it is also significant to limit the amount of carboxyl functionality which is utilized. On this basis, the ratio of carboxyl to N-alkylol groups should not exceed about 1.2:1, and is preferably not in excess of .9:1.

The monoethylenically unsaturated carboxylic acids which may be used in accordance with the invention are illustrated by acrylic acid, methacrylic acid, crotonic acid, fumaric acid, maleic acid, itaconic acid, monobutyl maleate, and the like. These may be used alone or in admixture with one another.

The balance of the interpolymer should contain at least 30%, preferably at least 60%, based on the weight of the interpolymer, of monoethylenically unsaturated monomers which provide relatively hard homopolymers, e.g., styrene, vinyl toluene, or methyl methacrylate. This insures that a properly cured film of a coating composition containing the interpolymer will possess significant hardness, desirably a pencil hardness of 1H or harder, preferably 2H or harder. These monomers which induce hardness, particularly when used in larger amount of 50% or more, are preferably accompanied by a small proportion, e.g., from 3–20%, preferably from 5–15%, based on the weight of the interpolymer, of an alcohol ester providing a long chain hydrocarbon terminal group, such as an ester of an alkanol containing at least 4 carbon atoms, and preferably at least 6 carbon atoms, with a monoethylenic carboxylic acid such as acrylic acid or the like. Ethylhexyl acrylate is a typical ester of the type under consideration and it will be used as illustrative. Other esters such as dodecyl acrylate or methacrylate or butyl acrylate or dioctyl maleate will further illustrate the class. The long chain terminal groups are normally chosen to include up to about 24 carbon atoms, though from 8-18 carbon atoms would be most usual. The monomers providing hard homopolymers are normally not used in an amount in excess of 85%, preferably not more than 80% of the interpolymer.

From the standpoint of the hardening monomers, styrene, preferably in an amount in excess of 60% of the weight of the copolymer, is particularly preferred since it is not only inexpensive, but it is unexpected that non-brittle cured films can be formed from compositions including such a large proportion of styrene. Normally, polymers containing styrene in these large amounts, when cured, are hard, but hardness is accompanied by considerable brittleness.

While other monoethylenic monomers may be present in the interpolymers, such as acrylonitrile, illustrating nonreactive monomers, or hydroxyethyl methacrylate, illustrating reactive monomers, the preferred interpolymers of this invention consist essentially of the alkylolated amide, the monoethylenic carboxylic acid, the monomers providing hard homopolymers, and the small proportion of long chain alcohol ester.

The amide component (monoethylenic carboxylic acid amides) may be varied considerably, and the amide may be alkylolated, typically with formaldehyde, to provide the N-methylol group, either before, during or after copolymerization. Acrylamide is the monomer most usually utilized, and it is methylolated by reaction with formaldehyde, conveniently in the form of paraformaldehyde, as part of the copolymerization reaction. It will be understood, however, that the acrylamide may be alkylolated before copolymerization, e.g., it may be replaced by N-methylol acrylamide, or that methylolation may be carried out as a separate step following completion of the copolymerization reaction.

Other amides which may be used are well known in the art and are illustratrated by methacrylamide.

The copolymerization reaction which is utilized is normally carried out in organic solvent solution medium, the organic solvent medium and the process of copolymerization being well known and illustrated with particularity in U.S. Pat. No. 3,163,623.

To briefly describe the solution copolymerization, the monomers are dissolved in organic solvent and copolymerized in the presence of dissolved paraformaldehyde, using conventional free radical polymerization catalysis. A small amount of amine catalyst is employed in order to minimize esterification. A small amount of an organic mercaptan is also usually used to minimize the molecular weight of the interpolymer which is formed.

Lastly, the polyhydric alcohol noted hereinbefore may be present during the copolymerization reaction even though a non-gelled interpolymer is desired which can be cured subsequently by baking after deposition in film form.

Accordingly, the thermosetting coating compositions of this invention comprise, in addition to the polyhydric alcohol component, a non-gelled interpolymer of monoethylenically unsaturated monomers comprising from 3–25% by weight of alkylolated carboxylic acid amide, alkylolation being effected at any time, an amount of monoethylenic carboxylic acid to provide in the interpolymer a ratio of carboxyl to N-alkylol functionality of from .3:1 to 1.2:1 and at least 30% by weight selected from the group of styrene, vinyl toluene and methyl methacrylate, and dissolved inorganic metal catalytic salt in the amounts noted hereinbefore.

Referring more particularly to the low molecular weight polyhydric alcohols which may be utilized in accordance with the invention, any organic polyhydric alcohol may be utilized having a molecular weight up to about 6000. There is no lower limit of molecular weight since ethylene glycol, the lowest molecular weight polyhydric alcohol, is useful herein. The preferred polyhydric alcohols are aliphatic polyethers and these preferably have an hydroxyl functionality of from about 2 to about 4, though higher functional polyhydric alcohols, such as sorbitol, are also useful, though less preferred. The polyhydric alcohols which may be utilized in this invention are further illustrated by diethylene glycol, triethylene glycol, tetraethylene glycol, propylene glycol, dipropylene glycol, polypropylene glycol 425, polypropylene glycol 1025, polypropylene glycol 2025, hexylene glycol, 2-methyl-2-ethyl-1,3-propanediol, 2-ethyl-1,3-hexanediol, 1,5-pentanediol, glycerine, 1,2,6-hexanetriol, thiodiglycol, and esterdiol having the formula

Preferred polyhydric alcohols are those having higher funtionality such as glycerine, and pentaerythritol and polyethers based thereon as by the reaction of ethylene oxide or propylene oxide with the trihydric or tetrahydric alcohol. Particularly preferred products are polyether derivatives of glycerine, trimethylol propane, hexanetriol, or pentaerythritol having a molecular weight in the range of from 1000 to 5000.

While entirely organic polyhydric alcohols are preferred, part of the molecule may be inorganic as, for example, polyhydric alcohols produced by reaction of a monoepoxide such as ethylene oxide or propylene oxide with phosphoric acid or benzene phosphonic acid, or polyhydric alcohols produced in similar fashion utilizing in the reaction one of the above-named glycols instead of all or a portion of the monoepoxide. Again, it is preferred that the polyhydric alcohol be a polyether.

The proportion of polyhydric alcohol which is employed in accordance with the invention is rather small, a ratio of hydroxy to N-alkoxy as small as .02:1 providing a desirable improvement in the flexibility and impact resistance of the cured films which are produced. Preferably, a hydroxy to N-alkoxy ratio of at least .04:1 is used, most preferably a ratio of from .06:1 to .3:1. Larger amounts up to a ratio of .6:1 may be utilized, but best results are obtained with smaller amounts as noted hereinbefore.

In this invention, there is incorporated in dissolved form an inorganic metal salt adapted to catalyze the N-methylol cure in an amount of from about 0.25% to about 2%, based on the weight of the interpolymer. As previously explained, these salts dominate the cure and, unexpectedly, enable a more rapid and lower temperature cure to take place without inducing embrittlement in the hard coatings which are desired. The use of such salts for the production of continuous coatings is disclosed and broadly claimed in the commonly owned copending application of Richard A. Young and Charles M. Taubman, filed Dec. 20, 1971 (Ser. No. 210,166).

The class of inorganic metal salts adapted to catalyze the N-methylol cure is a known one, usually employed in aqueous systems for impregnating fabrics to impart wash and wrinkle resistance, and any member of this known class may be used so long as the salt is in solution in the amount specified. On the other hand, some salts are superior and solvent selection is also important to insure solubility.

The metals which are used to form the salt are preferably selected from lithium, magnesium, calcium, barium, zinc or manganese. Cadmium, chromium, tin, cobalt, iron, nickel and copper are also useful, but less preferred. Cobalt, iron, nickel and copper tend to discolor the coatings and this is a disadvantage, but the catalytic cure is reasonably good. Strontium, aluminum, zirconium and titanium are broadly useful along with rare earths such as cesium and hafnium.

The preferred anion of the salt is a halide, most preferably a chloride or a perchlorate. Bromides are also useful and iodides, while catalytic, tend to discolor. Nitrates are very effective, but tend toward slight discoloration on excessive bake which can be avoided. Slight discoloration is easily tolerated in the darker colors. Phosphates, phosphites, oxychlorides, fluoborates, fluosilicates, sulfates, persulfates, and bisulfates are also useful.

Accordingly, the preferred salts are illustrated by lithium chloride, zinc chloride, magnesium chloride, calcium chloride, and barium chloride. Lithium chloride and bromide are quite good, and lithium is unique. Its solubility and effectiveness are completely different from other alkali metals and it is strongly catalytic, being effective in smaller amounts than any of the other metals noted herein. Indeed, as little as about 0.1% of lithium salt, based on resin solids, has some catalytic effect whereas at least about 0.25% is required for other salts.

The corresponding perchlorates and bromides are also quite useful and the nitrates are quite effective except for their slight discoloration on overbake. These are illustrated by zinc nitrate, magnesium chloride, calcium perchlorate, lithium bromide, tin dichloride, copper chloride, and barium chloride. Still further diverse salts such as zinc fluorborate, and also magnesium, copper or cobaltic fluoborate, magnesium perchlorate, lithium persulfate, copper persulfate, chromic nitrate and calcium phosphate are useful. Additionally, strontium nitrate, aluminum chloride, lithium bisulfate and zinc oxychloride may be used.

The proportion of dissolved salt is important since, unless at least about 0.25% of dissolved salt is present, based on the weight of the interpolymer, a significant catalytic effect is not observed except for lithium as previously noted. In practice, it is desirable to operate above the threshold level of about 0.25% since appreciable changes in curing rate and temperature normally require at least about 0.5% of dissolved salt. Particularly preferred proportions are from 0.5-1.5% of dissolved catalytic salt, based on the weight of interpolymer. An upper limit of about 4% is also important because, above this concentration of catalytic salt, there is a tendency to lose adhesion of the coating to the substrate. The prior use of these catalytic salts in aqueous medium for the treatment of fabrics has involved a much larger proportion of catalytic salt than can be tolerated in this invention.

The catalytic salt should be dissolved in the organic solvent medium and some solvents have a greater capacity for dissolving the required proportion of salt. On this basis, alcohols, including ether alcohols, are particularly preferred to constitute at least a portion of the solvent medium to insure the solubility of the catalytic salt. Thus, butanol, propanol, ethanol, 2-butoxy ethanol and 2-ethoxy ethanol will illustrate preferred solvents. Other solvents having preferred capacity for dissolving the catalytic salts are those having a high hydrogen bonding coefficient, such as dimethyl sulfoxide and dimethyl formamide.

It is desired to point out that this invention contemplates thermosetting coating solutions regardless of whether the coating is aqueous or, as is more conventional, non-aqueous, e.g., with the interpolymer in solution in an organic solvent. In the examples presented hereinafter, the copolymerization reaction is carried out in 2-ethoxy ethanol as the organic solvent and subsequent dilution of the resin solution is, again, with 2-ethoxy ethanol. Since 2-ethoxy ethanol is a water miscible organic solvent, the solutions produced in this invention can be dispersed in water with the aid of a base. In this connection, it will be observed that the high internal acidity which is required in this invention is normally sufficient to enable the resin solution to be dispersed in water with the aid of a base whenever the organic solvent is selected for water miscibility. On the other hand, the solvent solutions produced in this invention can be used as conventional organic solvent solution coating compositions regardless of whether or not a portion of the organic solvent is water miscible.

Typical organic solvents which can be utilized in order to formulate organic solution coatings, but not aqueous coatings, are mixtures of alcoholic solvents and aromatic hydrocarbon solvents, typically an approximately 50/50 weight ratio mixture of butanol with aromatic hydrocarbon solvents. On the other hand, organic solvents such as methyl ethyl ketone, acetone, 2-butoxy ethanol, isopropanol, and the like constitute part of the well known class of water miscible organic solvents which can be utilized when aqueous coatings are desired. Correspondingly, and from the standpoint of the polyhydric alcohol, many of the polyhydric alcohols noted hereinbefore, and essentially those which are polyethers, are fully miscible in water and these can be used without modification regardless of whether the final coating solution is organic solvent based or water based.

The water miscible organic solvents are quite important to this invention since they assist in dispersing the interpolymer in the aqueous medium and provide a proportion of organic solvent to hold the catalytic salt at least partly in solution during the cure so that the catalytic salt continues to dominate the cure within the continuous films which are formed despite the fact that the film may have been deposited from aqueous medium.

From the standpoint of water solutions, one simply reacts a base, such as an amine, with the carboxyl content of the resin to provide water dispersibility through salt formation. The pH of the water dispersion produced in this way can vary from about 6 to about 11, but is preferably in the range of pH 7 to pH 10.

These water solutions, if they have a resin solids content in excess of about 20%, can be applied in any conventional fashion, as by spraying, brushing, dipping, or the like.

The invention is illustrated in the examples which follow.

EXAMPLE 1

Preparation of Acrylamide Copolymer

Procedure of preparation

Parts by weight
450 2-Ethoxy ethanol
165 Polyhydric alcohol (see Note 1)
 30 Fumaric acid
105 Paraformaldehyde
    Charge the foregoing to reactor, set reflux condenser, and heat to 115° C. using agitation.
135 Acrylamide
570 2-ethoxy ethanol
  2 Triethyl amine
1155 Styrene
130 2-ethylhexyl acrylate
 52 Acrylic acid
  6 Tertiary dodecyl mercaptan
 16 Azobisisobutyronitrile
 11 Benzoyl peroxide
    Premix the above and add to reactor over a 3 hour period at 115–118° C. Hold for one hour.
 10 Cumene-hydro-peroxide—add and hold 1 hour.
 10 Cumene-hydro-peroxide—add and hold 1 hour.
 10 Cumene-hydro-peroxide—add and hold 1 hour.
    Start cooling and add:
675 2-ethoxy ethanol Final characteristics Solids _____ 52.8%.
Viscosity _____ Y-Z (Gardner-Holdt).
Acid value _____ 34.8.

Note 1.—Trimethylol propane reacted with propylene oxide to produce a liquid polyoxypropylene derivative of trimethylol propane having a molecular weight of 2540, and an hydroxyl number of 63. The hydroxyl functionality is 3, the same as for trimethylol propane. The liquid is therefore a trihydric polyether having a viscosity at 25° C. of 440 centipoises.

With reference to this example, the interpolymer includes .508 equivalent of carboxyl from the fumaric acid and .722 equivalent of carboxyl from the acrylic acid, providing a total of 1.230 equivalents of carboxyl. Since there are 1.9 equivalents of N-methylol provided by the methylolated acrylamide, this provides a ratio of carboxyl to N-alkylol of .648:1.

The polyhydric alcohol, being a triol of molecular weight 2540, provides 0.185 equivalent of hydroxyl, an hydroxyl to N-alkylol of .098:1.

The interpolymer produced in this example is formulated into a pigmented coating having a total solids content of 60%, and a ratio of pigment to resin solids of 1:1, by dispersing 300 parts of titanium dioxide pigment in 135 parts of the solution of this example, together with 60 parts of additional 2-ethoxy ethanol. A high speed mixer is used to provide a uniformly dispersed paste. There is then mixed into the paste 461 parts of additional solution of this example and 97 parts of additional 2-ethoxy ethanol to provide a white pigmented coating solution having a viscosity measured in a No. 4 Ford Cup of 85 seconds.

Evaluation of Example 1.—Drawdowns of the white-pigmented coating solution prepared as described in Example 1 are made on aluminum panels using #36 wound-wire rod and cured in an electric oven for 75 seconds.

The degree of cure was checked by rubbing the coated panels with a cloth saturated with methyl ethyl ketone.

CURING RESULTS

| Oven temperature | Coating of Example 1 | Zinc nitrate catalyst coating of Ex. 1 with 0.75% catalyst—(See Note 2) |
| --- | --- | --- |
| 360° F | 10 methyl ethyl ketone rubs—film completely dissolved. | 10 methyl ethyl ketone rubs, film continuous, some loss of gloss. |
| 380° F | 20 methyl ethyl ketone rubs—film completely disintegrated. | 20 methyl ethyl ketone rubs, film intact, slight loss of gloss. |
| 400° F | 40 methyl ethyl ketone rubs—film completely disintegrated. | 40 methyl ethyl ketone rubs, glossy continuous film, very slight loss of gloss. |

Note 2.—Zinc nitrate was dissolved in butyl alcohol to dilute the coating solution to form a 10% solution thereof, and this catalyst solution was used instead of pure solvent to provide 0.75% of zinc nitrate based on the weight of the interpolymer.

The coating solution of Example 1 was then applied by a Bird applicator onto zinc phosphate treated steel panels to deposit a wet coating having a thickness of about 3 mils and the coated panels were baked at 250° F. for 10 or 20 minutes.

The degree of cure was checked by rubbing the coated panels with a piece of cloth, which was saturated with methyl ethyl ketone solvent.

| Oven temperature | Coating of Example 1 | Coating of Example 1 with 1% catalyst—(See Note 3) |
| --- | --- | --- |
| 250° F. for— | | |
| 10 mins | 50 methyl ethyl ketone rubs—film completely dissolved. | 50 methyl ethyl ketone rubs continuous film, some loss of gloss |
| 20 mins | 100 methyl ethyl ketone rubs—film dissolved. | 100 methyl ethyl ketone rubs continuous film, very slight loss of gloss. |

Note 3.—Lithium nitrate was dissolved in butyl alcohol to provide a catalyst solution which was used in place of the pure solvent in Example 1 to provide 1.0% of lithium nitrate, based on the weight of the interpolymer.

EXAMPLE 2

Procedure of preparation

Parts by weight
- 450 2-ethoxy ethanol
- 105 Paraformaldehyde
- 30 Fumaric acid
- 165 Polyhydric alcohol (see Note 4)

Charge the foregoing into a reactor equipped with an agitator, reflux condenser and nitrogen inlet tube. Heat to 115° C.

- 135 Acrylamine ⎫
- 670 2-ethoxy ethanol ⎬ Dissolve
- 2 Triethyl amine ⎭
- 1155 Styrene
- 130 2-ethylhexyl acrylate
- 70 Acrylic acid
- 40 Azobisisobutyronitrile
- 45 Tertiary dodecyl mercaptan Premix all the foregoing monomers, solvent and catalysts and add to reactor over a 3 hour period at 115–120° C. Hold for one hour.

- 12 Cumene-hydro-peroxide—add and hold 1 hour.
- 12 Cumene-hydro-peroxide—add and hold 1 hour.
- 12 Cumene-hydro-peroxide—add and hold 1 hour.
- 140 Dimethylethanol amine and
- 165 Isopropanol cool to 90° C. and add amine and isopropanol. Hold 1 hour, cool and filter.

Final characteristics

Solids _____ 58.1%.
Gardner viscosity _____ Y-Z.
Acid value _____ 38.7.

Note 4.—Liquid polyoxypropylene derivative of trimethylol propane having a molecular weight of 2570, an hydroxy number of 63 and an hydroxy functionality of 3 (viscosity at 25° C. of 440 centipoises).

Evaluation of water soluble acrylamide polymer.—Two solutions of water soluble acrylamide were prepared.

Solution 1 (contains 1% zinc chloride based on resin solids)

|  | Grams |
| --- | --- |
| Polymer solution of Example 2 | 1000 |
| Deionized water | 1000 |
| 10% zinc chloride solution in butanol | 58 |

Solution 2 (contains no metallic catalyst)

|  | Grams |
| --- | --- |
| Polymer solution of Example 2 | 1000 |
| Deionized water | 1000 |
| Butanol | 58 |

Solutions 1 and 2 were drawn down on zinc phosphate treated steel panels and cured in an electric oven at 300° F. for 10 minutes. The films produced from both solutions exhibited excellent gloss, flexibility and impact resistance. The film containing zinc metal catalyst was completely insoluble in methyl ethyl ketone (it passed 50 rubs with a methyl ethyl ketone saturated cloth). The film containing no zinc catalyst was thermoplastic and after 50 methyl ethyl ketone rubs, was redissolved.

Additional properties of the films, when cured at 300° F. for 10 minutes are as follows:

|  | Solution 1 (with catalyst) | Solution 2 (no catalyst) |
| --- | --- | --- |
| Pencil hardness | 2H | HB. |
| Impact (60 inch/lbs. of forward impact). | Pass | Pass. |
| Flexibility (1/4″ mandrel) | do | Do. |
| Loss of adhesion after bending | None | None. |
| Gloss (60° glossmeter) | 91 | 89. |
| Detergent resistance (1% Tide immersion at 165° F.). | Pass 72 hours | Fail 48 hours. |

EXAMPLE 3

Example 2 was repeated, only the polyhydric alcohol component was omitted, the example otherwise being reproduced without change. The following properties were obtained when 1% of zinc chloride metallic catalyst was incorporated into the resin solutions.

Films 1 mil in thickness were applied and cured for 20 minutes at 300° F. to provide the following properties.

|  | Example 2, 1% zinc chloride (with polyhydric alcohol) | Example 3, 1% zinc chloride (no polyhydric alcohol) |
|---|---|---|
| Pencil hardness | 2H-3H | 2H-3H. |
| Impact: | | |
| Forward 80 inch/lbs | Pass | Fail. |
| Reverse 40 inch/lbs | do | Do. |
| Flexibility (¼" mandrel) | do | Do.[1] |
| Solvent resistance (50 methyl ethyl ketone rubs). | do | Pass. |
| Gloss (60° glossmeter) | 89 | 90. |

[1] Complete delamination.

The invention is defined in the claims which follow.

I claim:

1. An externally catalyzed thermosetting coating composition comprising non-gelled solution interpolymer of monoethylenically unsaturated monomers comprising from 3–25% by weight of alkylolated carboxylic acid amide, monoethylenic carboxylic acid in an amount to provide in the interpolymer a ratio of carboxyl to N-alkylol functionality of from .3:1 to 1.2:1, and at least 30% by weight from the group of styrene, vinyl toluene and methyl methacrylate, and a polyhydric alcohol having a molecular weight of up to about 6000 providing a ratio of hydroxy to N-alkylol functionality of from .02:1 to .6:1, said coating composition having dissolved therein an effective amount up to about 4%, based on the weight of the interpolymer, of inorganic metal catalytic salt adapted to catalyze the N-methylol cure and selected from nitrates of lithium, magnesium, calcium, barium, zinc and manganese, and being adapted to deposit coatings which cure on baking to provide a pencil hardness of 1H or harder.

2. An externally catalzed thermosetting coating composition comprising non-gelled solution interpolymer of monoethylenically unsaturated monomers comprising from 3–25% by weight of alkylolated carboxylic acid amide, monoethylenic carboxylic acid in an amount to provide in the interpolymer a ratio of carboxyl to N-alkylol functionality of from .3:1 to 1.21, and at least 30% by weight from the group of styrene, vinyl toluene and methyl methacrylate, and a polyhydric alcohol which is a polyether provided by reaction of ethylene oxide or propylene oxide with trihydric or tetrahydric alcohol, said polyhydric alcohol having a molecular weight of up to about 6000 providing a ratio of hydroxy to N-alkylol functionality of from .02:1 to .6:1, said coating composition having dissolved therein an effective amount up to about 4%, based on the weight of the interpolymer, of inorganic metal catalytic salt adapted to catalyze the N-methylol cure, and being adapted to deposit coatings which cure on baking to provide a pencil hardness of 1H or harder.

3. An externally catalyzed thermosetting coating composition comprising non-gelled solution interpolymer of monoethylenically unsaturated monomers comprising from 3–25% by weight of an acrylamide which is methylolated in the interploymer, monoethylenic carboxylic acid in an amount to provide in the interpolymer a ratio of carboxyl to N-methylol functionality of from .3:1 to 1.2:1, and at least 30% by weight from the group of styrene, vinyl toluene and methyl methacrylate, and an aliphatic polyhydric alcohol having an hydroxy functionality of 3 or 4 and a molecular weight of up to about 6000 providing a ratio of hydroxy to N-methylol functionality of from .06:1 to .3:1, said coating composition having dissolved therein an amount of from about 0.1% to about 3%, based on the weight of the interpolymer, of inorganic metal catalytic salt adapted to catalyze the N-methylol cure, said metal salt being selected from chlorides, perchlorates, bromides, and nitrates of lithium, magnesium, calcium, barium, zinc, and manganese, and being adapted to deposit coatings which cure on baking to provide a pencil hardness of 1H or harder.

4. A coating composition as recited in claim 3 in which said metal salt is a chloride.

5. A coating composition as recited in claim 3 in which the ratio of carboxyl to N-methylol functionality is from .5:1 to .9:1.

6. A coating composition as recited in claim 3 in which said interpolymer comprises from 60%–85% by weight of styrene, vinyl toluene or methyl methacrylate and is adapted to deposit coatings which cure on baking to provide a pencil hardness of 2H or harder.

7. A coating composition as recited in claim 6 in which said interpolymer further includes from 3–20% by weight of monoethylenic alcohol ester providing a long chain hydrocarbon terminal group containing at least 4 carbon atoms.

8. A thermosetting coating composition as recited in claim 7 in which said ester is an ester of an alkanol containing 8–18 carbon atoms with a monoethylenic carboxylic acid.

9. A coating composition as recited in claim 2 in which said polyether has a molecular weight in the range of from 1000 to 5000.

10. A coating composition as recited in claim 2 in which said polyether is used to provide a ratio of hydroxy to N-alkylol functionality of from .06:1 to .3:1.

11. A coating composition as recited in claim 3 in which said interpolymer and said polyhydric alcohol are in solution in a monohydric organic solvent comprising an alcohol.

12. A coating composition as recited in claim 11 in which said organic solvent is water miscible.

13. A coating composition as recited in claim 12 in which said solution in water miscible organic solvent is dispersed in water with the aid of a base.

References Cited
UNITED STATES PATENTS

| | | | |
|---|---|---|---|
| 3,079,434 | 2/1963 | Christenson | 260—80.73 |
| 3,682,871 | 8/1972 | Mikofalvy | 260—80.73 |
| 3,011,993 | 12/1961 | Kapalko | 260—80.73 |
| 2,718,515 | 9/1955 | Thomas | 260—80.73 |
| 2,680,110 | 6/1954 | Loughran | 260—80.73 |
| 3,380,851 | 4/1968 | Lindemann | 260—80.73 |
| 3,580,879 | 5/1971 | Higashimura | 260—80.73 |
| 3,616,136 | 10/1971 | Endrenyi | 260—80.73 |

MORRIS LIEBMAN, Primary Examiner

P. R. MICHL, Assistant Examiner

U.S. Cl. X.R.

260—32.8 N, 33.2 R, 33.4 R, 80.73